RE 25274

Jan. 3, 1961     H. L. HAYES     2,966,973
TORQUE CLUTCH Filed April 1, 1954     4 Sheets-Sheet 1

FIG. 1.

INVENTOR.
Henry L. Hayes.
BY
Harness, Dickey & Pierce.
ATTORNEYS.

Jan. 3, 1961

H. L. HAYES

2,966,973

TORQUE CLUTCH

Filed April 1, 1954

INVENTOR.
Henry L. Hayes.
BY
Harness, Dickey & Pierce
ATTORNEYS

Jan. 3, 1961 H. L. HAYES 2,966,973
TORQUE CLUTCH

Filed April 1, 1954 4 Sheets-Sheet 4

INVENTOR.
Henry L. Hayes.
BY
Harness, Dickey & Pierce,
ATTORNEYS.

United States Patent Office 2,966,973
Patented Jan. 3, 1961

2,966,973
TORQUE CLUTCH
Henry L. Hayes, Royal Oak, Mich.
(496 E. Baker, Clawson, Mich.)
Filed Apr. 1, 1954, Ser. No. 420,383
12 Claims. (Cl. 192—56)

My invention relates to mechanical torque transmitting devices and, in particular, refers to torque clutches which operate automatically to limit the magnitude of the torque that can be transmitted. Devices of this sort are commonly used to tighten bolts, nuts, etc.

Present commercial torque clutches of a mechanical type are not satisfactory to those in industry, principally because they are incapable of closely and accurately controlling the maximum torque to be applied to the work being handled. They also tend to be rather bulky and cumbersome and to wear rapidly, or damage the work, due to severe shock loads resulting from the nature of their operation.

It is the purpose of my invention to overcome these and other shortcomings of the prior art and to provide a compact, substantially friction-free and shock-free torque clutch construction of a mechanical type which will consistently deliver exactly the torque that it is set to deliver. In accomplishing this I use a special ball type clutch which throws out when the torque reaches a certain magnitude as determined by a spring. As the ball clutch disconnects itself, it operates a ball cam arrangement that acts independently of the spring to furnish the final torque and angular movement to the output shaft and tool.

The invention includes a number of other features of importance, such as automatic locking and unlocking, which will be described in detail in connection with the accompanying drawings of a preferred embodiment which has been selected to illustrate the principles of my invention:

*Construction*

Figure 1:
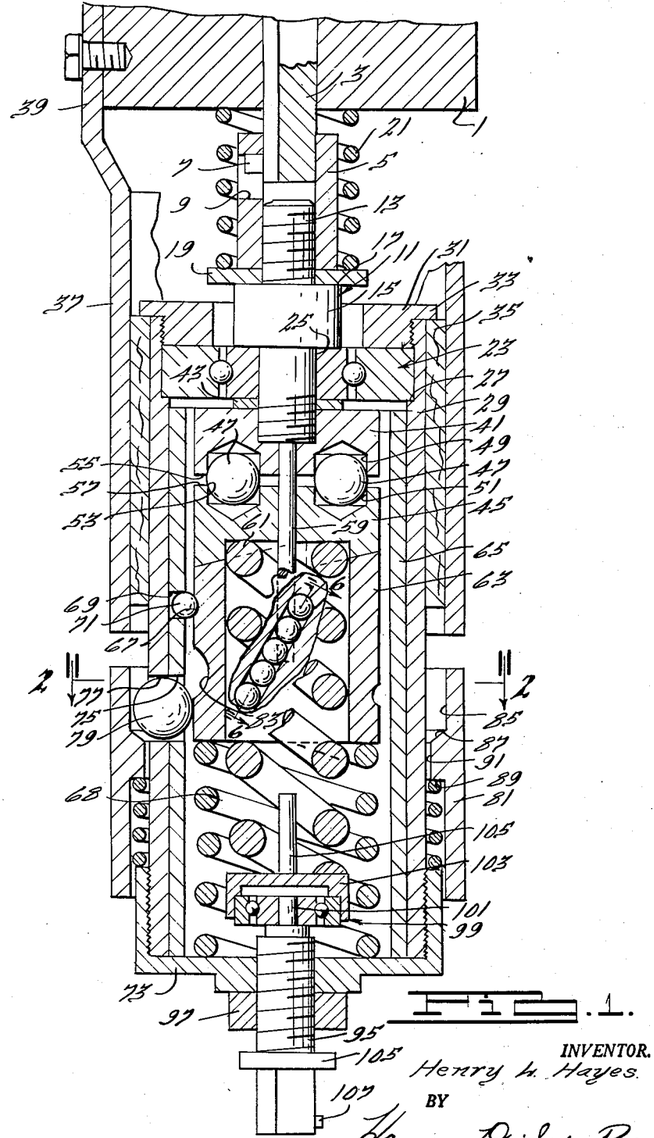
Figure 1 is a longitudinal cross section through a torque clutch device embodying the invention.
Figure 2:
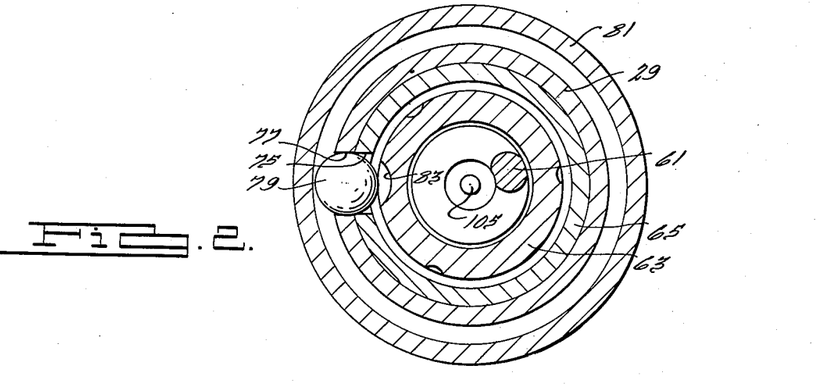
Fig. 2 is a cross section, normal to the axis, taken on line 2—2 of Fig. 1.
Figure 3:
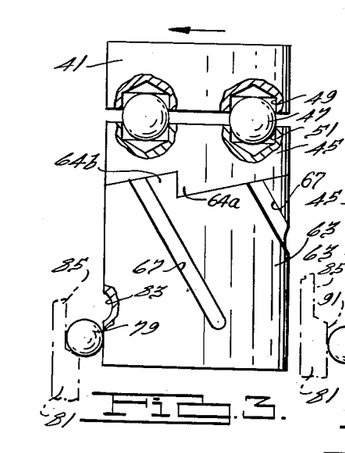
Figs. 3–5 are diagrammatic views showing certain operating features of the construction.

The torque clutch mechanism of this invention receives rotary driving torque from any suitable machine or power drive. A fragment of the head of a machine 1 is illustrated and it has the rotary square drive 3 that rotates a drive collar 5 and has a radial projection 7 disposed in a slot 9 in the collar to prevent the collar from slipping off the drive 3. The torque clutch has a spindle 11 that threads into the collar 5, as shown at 13, so that rotation of the collar rotates the spindle. The spindle 11 has an enlarged diameter 15 that provides a shoulder 17 against which the washer 19 is pressed by a spring 21 which is confined between the washer and head 1. It will be seen that the spring 21 normally holds the projection 7 in the top of slot 9 but that the collar 5, spindle 11, and connected parts can all be moved upwardly for a limited distance against spring 21 toward the head and relative to drive 3 to provide a certain amount of yieldable flexibility in the over-all length of the mechanism.

The rotary spindle 11 is rotatably mounted in a sealed ball bearing set 23, the inner race of which is fitted on portion 25 of spindle 11 and the outer race of which is seated on shoulder 27 of sleeve 29. A cap 31 threads into the top of sleeve 29 and the flanged edge 33 thereof rests on the top edge of a bronze, oilite, or other suitable kind of bearing sleeve 35. The bearing sleeve 35 is suitably attached by screws, rivets, etc., to an outer casing 37 and the latter has upwardly extending arms 39 that may be bolted to the machine 1. It will be seen that the casing 37 may carry most of the weight of the mechanism by virtue of the connection of sleeve 29 and cap 31 to the bearing 35.

Figure 7:
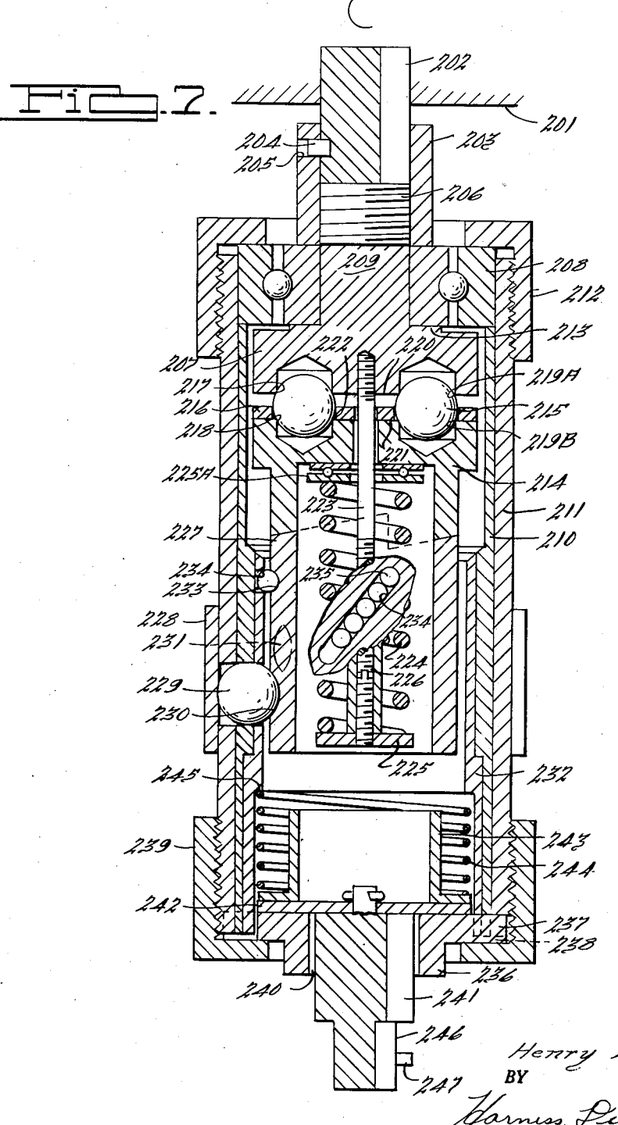
Fig. 7 is a longitudinal cross section through another form of the invention.
Figure 8:
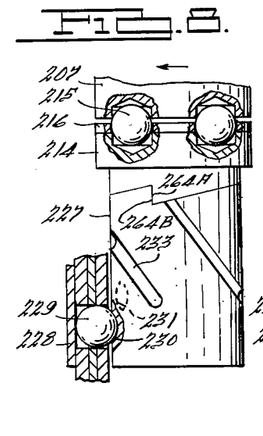
Figs. 8–10 are diagrammatic views showing certain operating features of the construction.
Figure 9:
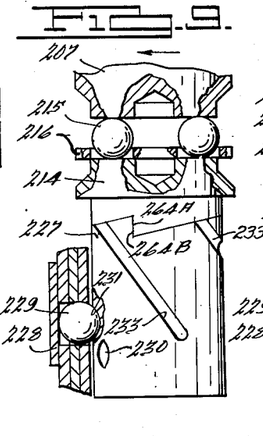
Figure 10:
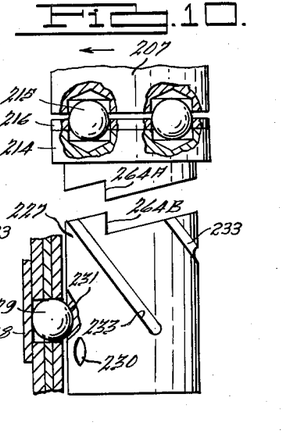
Figures 11, 12:
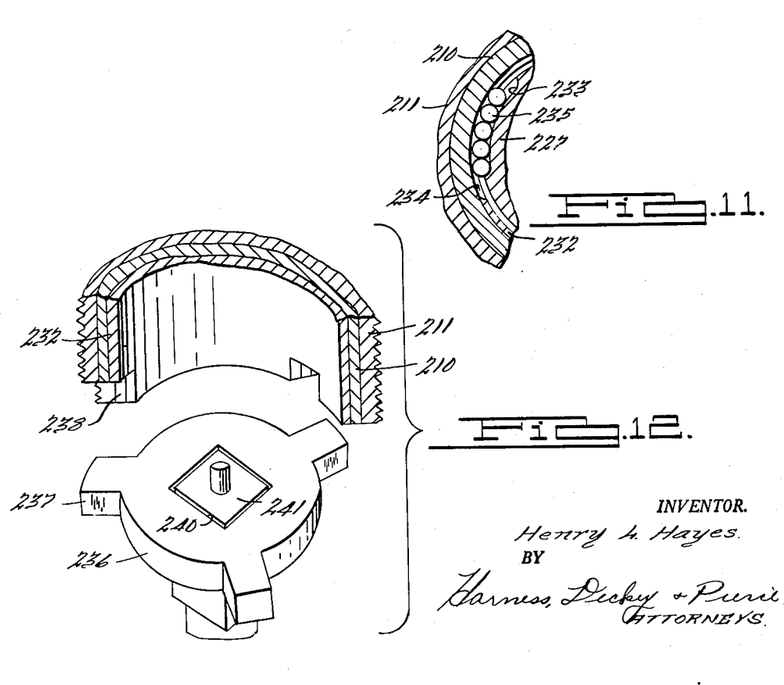
Fig. 11 is a view similar to Fig. 6 of the modified form.
Fig. 12 is a view of the lock between the sleeves and output member.

The lower part of spindle portion 25 is threaded into a top or driving clutch plate 41 so that the two rotate together. A washer 43 between the inner race and the plate 41 acts to space the plate from the bearing. The clutch plate 41 drives the lower or driven clutch plate 45 through a plurality of balls 47 preferably five in number, which are preferably equiangularly spaced around the axis of the plates 41 and 45 (the drawing showing two balls on a diameter in order to make the construction more readily understood). The clutch plates 41 and 45 have registering identical drilled holes 49 and 51, respectively, of slightly smaller diameter than the balls, in which the balls are seated to key the clutch plates together. It is to be noted that the balls are seated on the sharp, squared edges 53 of the drilled holes so that there is merely a circular line contact between each ball and plate. This feature permits high torque transmittal, minimizes surface contact and friction, and makes it possible to rework the ball seats by simply grinding a few thousandths off the flat, drilled faces 55 and 57, respectively, of the plates 41 and 45 to produce sharp, new edges 53. The line contacts of the balls with the edges 53 are preferably rather near the midplanes of the balls, the distance of them from the midplanes affecting, of course, the torque that they can transmit without rolling out of the holes. If desired, a plate retainer can be used for the balls to hold them in proper radial position as shown in Fig. 7, though this is not thought to be necessary.

The two clutch plates are centered or axially aligned with each other by means of the spindle 11 which has a stem 59 extending through the plates. The stem 59 also serves to align a spring 61 which bears upon the bottom of plate 45 to force it up against the balls 47 and toward the plate 41. When the torque transmitted from plate 41 to plate 45 through the balls 47, exceeds a value predetermined by the spring 61, the balls will force the plate 45 down and snap out of their seats 53 to disconnect plate 45 from plate 41.

Prior to disconnection and when the balls 47 operate to drivingly connect plates 41 and 45, clockwise driving rotation from plate 45 is transmitted to ratchet sleeve 63 by means of interfitting ratchet teeth 64a and 64b on the plate 45 and sleeve 63, respectively. A spring 68 engages the bottom of sleeve 63 to yieldably hold the teeth in engagement but to permit downward movement of the sleeve 63 along with lower clutch plate 45 when the balls 47 come out of their seats.

Figures 4, 5:
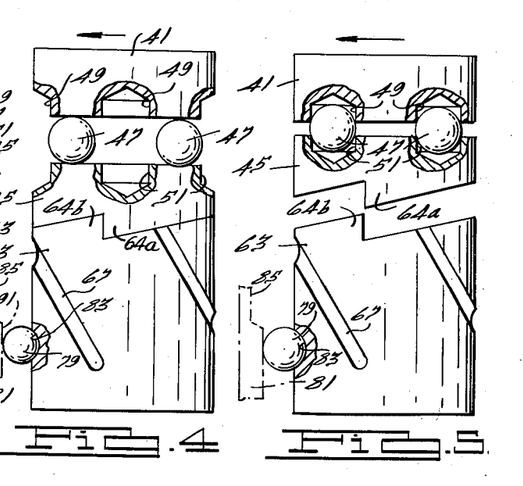
Figure 6:
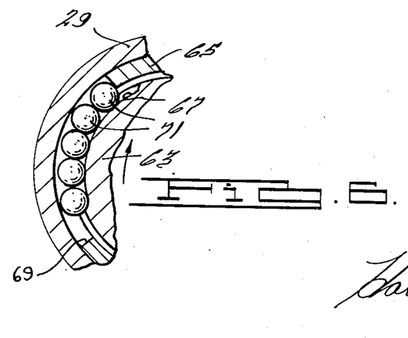
Fig. 6 is a partial section taken on line 6—6 of Fig. 1.

Rotary movement of the ratchet sleeve 63 is transmitted to a cam sleeve 65 by a cam-key connection that, upon downward axial movement of sleeve 63, forces the sleeve 65 to move angularly (rotatably) relative to the rotatable parts, such as 63, 45, 41, 11, and 3, that have already been described. The angular movement of sleeve 65 is such that it is speeded up or moves ahead of parts 63, 45, etc. The cam-key connection comprises a series of slots 67 (preferably three) formed in sleeve 63 and the same number of slots 69 in the sleeve 65. The slots 67 and 69 register with each other when the balls 47 are in their recesses 49 and 51. The slots 67 and 69 are preferably straight (even though cut on cylindrical surfaces) and are all cut on the same angle. For manufacturing reasons, the slots 69 will normally be cut clear through the wall of sleeve 65 but slots 67 will normally be grooved out of the periphery of sleeve 63. The slots are inclined so that the top end is the leading edge with respect to the direction of rotation. The angle between each slot and a vertical line extending up from the bottom of the slot is preferably around 30–60 degrees. A plurality of balls 71, preferably about five, are disposed in each pair of registering slots 67—69 and act as friction-free keys between the sleeves 63 and 65. The balls 71 will roll to the bottoms (trailing edges) of slots 67 and 69 when the parts are not revolving; however, upon rotation, the balls will be driven by the bottoms (trailing edges) of slots 67 and will drive the tops (leading edges) of slots 69. The balls 71 hold the slots 67 and 69 in exact registry. Hence, when the sleeve 63 is forced down during the instant of disconnection (by balls 47), the walls of slots 67 in sleeve 63 will carry the balls 71 down with the sleeve. Since the balls 71 are moving down and they engage the walls of slots 69 in sleeve 65, they will try to force the sleeve 65 to move down also. The sleeve 65, however, is fixed in axial position and cannot move down. The balls 71 will therefore have to roll down the incline of slots 69 and since the balls are being pressed with an axial force against the incline they will wedge or cam sleeve 65 forward in the direction of rotation (and relative to sleeve 63) until the balls 47 are out of holes 49 and 51 (Fig. 5). The angle of the slots will determine the mechanical advantage of this camming action and in conjunction with the diameter of balls 47 will determine the amount of such rotation relative to sleeve 63. It is possible, therefore, in the design of the unit to control or predetermine these factors.

The cam sleeve 65 is supported in fixed axial position by a bottom cap 73 that threads onto the bottom end of sleeve 29. The sleeve 65 has three openings 75 in its side which register with identical openings 77 in the wall of sleeve 29. Locking balls 79 having a diameter substantially larger than the combined thicknesses of the sleeves is confined in the pair of registered openings by a locking sleeve 81. The ratchet sleeve 63 has three ball seats 83 of suitable shape located above its bottom end at a position such that the balls 79 will enter it when the sleeve is axially moved down by balls 47 and lock it in such axial position wherein the mechanism has cut out and is inoperative to transmit torque. The locking sleeve 81 has a top and large inner diameter portion 85 which permits the ball to be moved radially outwardly in holes 75 and 77 so that the sleeve 63 can occupy its operative position of Fig. 1. The sleeve 81 has an inner reduced diameter portion which provides top and bottom shoulders 87 and 89, respectively, and ball engaging diameter 91. A spring 93 is compressed between shoulder 89 and the top of cap 73 and when the sleeve 63 is moved axially down so that seat 83 registers with the ball 79 it forces the locking sleeve 81 upwardly and slanted shoulder 87 cams the ball 79 radially inwardly into the seat 83 to lock the sleeve 63. The diameter 91 will then be in line with the balls and will hold it on its seats 83. In this position of the sleeve its top will be immediately adjacent if not in contact with the bottom edge of casing 37. It will be clear that the balls 79 will be released and the sleeve 63 unlocked by depressing sleeve 81 against spring 89 until large diameter 85 is in line with the balls whereupon pressure of spring 68, seated on cap 73, to raise sleeve 63 will cam the balls 79 outwardly to unseat it from seat 83. The locking sleeve 81 can be forced down by hand in order to unlock or this can be accomplished mechanically because of contact of casing 37 with sleeve 81, the spring 21 and collar 5 construction permitting relative axial movement of the casing and sleeves 29 and 65 when the head 1 is fed toward the work and the clutch mechanism is prevented from such movement by contact with the work.

Rotation and angular movement of cam sleeve 65, as already described, is transmitted by balls 79 to sleeve 29 and thence to bottom cap 73. Power output shaft 95 is threaded into cap 73 and held in axially adjusted position by lock nut 97 that is threaded on to the shaft against the bottom of the cap. Shaft 95 is, of course, coaxial with the other rotary parts of the mechanism and by threading it in or out of the cap 73 it moves along the axis of revolution so that the axial position of its top end is varied relative to the other parts. The top of shaft 95 carries a ball bearing set 99 that seats on a reduced diameter portion 101 of the shaft. The outer race of the ball bearing rotatably supports a seat 103 for spring 61, the seat having alignment stem 105 projecting toward stem 59 and being able to rotate relative to the other parts of the device. Being carried by shaft 95, the seat 103 can be adjusted axially relative to the bottom of driven clutch plate 45 thus making it possible to vary the initial setting of spring 61 and the torque at which the balls 47 roll out of holes 49 and 51.

The power output shaft 95 has a shoulder 105 and projection 107 or any other suitable means whereby a tool, such as a hex socket for tightening bolts, etc., can be readily and operatively coupled to it.

*Operation*

During operation of the mechanism to transmit power from power input shaft 3 to power output shaft 95, clockwise rotation of shaft 3 causes the collar 5 to rotate and this rotates spindle 11. The spindle rotates top clutch plate 41 and this rotation is transmitted to lower clutch plate 45 by virtue of balls 47 which are seated on the edges 53 of holes 49 and 51 in the clutch plates. The lower clutch plate 45 has ratchet teeth 64a which engage the teeth 64b on ratchet sleeve 63 so that clockwise rotation of plate 45 causes similar rotation of sleeve 63. By virtue of the cam-key connection provided by balls 71 acting in slots 67 and 69, rotation of sleeve 63 is transmitted to cam sleeve 65. One or more lock balls 79 fit in pairs of holes 75 and 77 of sleeves 65 and 29 so that rotation of sleeve 65 causes rotation of sleeve 29. The cap 73 is fixed to sleeve 29 and therefore rotates with it. Since power output shaft 95 is fixed to cap 73 for rotation with it, the torque transmitted through the various parts, as just described, can be removed by suitable connection to shaft 95.

The power supplied by input shaft 3 is determined by the resistance which the output shaft 95 encounters. In the usual type of use, e.g., tightening bolts, studs, etc., the resistance increases as rotation of the output shaft 95 continues. In other words the work will usually require that a constantly increasing torque be applied to its by shaft 95. The machine 1, however, is powerful enough to deliver torque which is greatly in excess of that which most work can safely receive. For example, the machine 1 could probably, in most applications, easily shear off the head of a stud screwed into a block. Hence, as a safety measure, it is desirable to provide a clutch mechanism that will automatically cut out or disconnect the power input shaft from the power output shaft when a predetermined maximum torque is reached for the particular job being done. It is also very desirable to provide such a clutch mechanism for the sake of torque control itself since cut off at a predetermined torque will make it possible to control the prestressing of the work which receives torque from output shaft 95. To mention a familiar example, the maximum torque applied to a bolt that is threaded in place will determine the amount of its elongation and the tension in it. In the past, however, mechanical torque clutch devices were not accurate; there was actually a variation in the order of at least plus or minus five foot pounds in the torque at which the clutch would operate even though set for a definite maximum torque. Theoretically, the devices would give a certain precise maximum torque but in actual use they cut off unpredictably anywhere over a rather wide range of torques. This characteristic has made them very unsatisfactory as a means for prestressing bolts, studs, etc. The present construction, however, is very reliable in this respect and can be successfully used as a torque control or prestress control means.

As indicated hereinbefore, the length of spring 61 can be varied by means of shaft 95 and this adjustment determines the maximum torque that the walls 47 will transmit from clutch plate 41 to clutch plate 45. When the work calls for a torque to be delivered from input shaft 3 to output shaft 95 which is in excess of the maximum as determined by spring 61 (plus, of course, weaker spring 68), the couple on each of the balls 47 will force them to start to roll to the left out of their seats on the edges of holes 49 and 51. The balls 47 act like cams and wedge the plate 45 (and sleeve 63) downwardly against the resistance of spring 61. Because of the line contact feature due to sharp corners 53, friction is minimized and the balls seem to actually roll rather than slide and for this reason the clutch itself does not throw an additional torque absorbing resistance into the system. While the precise action of the balls 47 has not been observed, it seems that eventually the balls 47 are completely out of the holes 49 and 51 (see Fig. 4) and maximum downward movement of members 45 and 63 has occurred. At this point the lock ball 79 is pushed into recess 83 by the pressure of spring 89 on lock sleeve 81 and the sleeve 63 is locked in down position. Continued rotation of top clutch plate 41 brings the next holes 49 and 51 into alignment with each ball 47 and the pressure of spring 61 forces the balls to seat again and lifts plate 45 from sleeve 63 so that ratchet teeth 64a and 64b are disengaged (see Fig. 5). In this position clutch plates 41 and 45 will rotate idly supported by spring 61 which is permitted to rotate because of its ball bearing seat 103, but sleeve 63 is stationary and no torque or rotation reaches output shaft 95.

The torque at which the springs 61 and 68 are overcome and at which the balls 47 roll out of the holes over faces 55 and 57 of clutch plates 41 and 45 is not the maximum torque delivered to output shaft 95. As pointed out hereinabove, when the sleeve 63 is cammed down by balls 47 the balls 71 are carried downwardly with the sleeve. The balls 71 therefore operate in slots 69 of sleeve 65 to cam it angularly about the axis of revolution and this applies a torque to output shaft 95 that is greater than the maximum torque as determined by the spring 61. The magnitude of the cam torque and the degree of angular movement can, as mentioned before, be regulated by the slope of the slots and diameter of balls 47. Since the cam torque is not acting in opposition to springs 61 and 68 which have already been overcome it will be seen that the control spring 61 can be much smaller and weaker than it would be if the cam-key connection was not used. The last bit of angular movement of the work (e.g. bolt, nut, etc.) requires the most torque and it will be seen that this is accurately and positively provided by cam balls 47 and cam balls 71 independently of the various springs. In other words the maximum or cut-out torque of the clutch mechanism is dependent upon the operation of balls 71 in slots 67 and 69. Viewing the torque disconnect as a whole, it will be noticed that the control spring 61 puts ball cam 47 system into operation and that this in turn operates the ball cam 71 system. The ball cam 47 system stops automatically when the balls are out of holes 49 and 51 and this, of course, deactivates ball cam 71 system and power output shaft 95.

After the unit has disconnected itself, the sleeve 63 will be locked in down position by ball 79 and locking sleeve 81 which will be in up position in contact with the bottom of casing 37. In this condition the sleeve 63 and output shaft 95 will be stationary so that the tool carried by shaft 95 can engage the work without damage to either. When the tool on shaft 95 is aligned with a bolt to be tightened, or other workpiece, and then the head 1 is moved down to effect operative engagement of tool and workpiece, the contact of the tool (which is not rotating) with the workpiece will fix the axial position of shaft 95, cap 73, sleeve 29, bearing 23, spindle 11, and collar 5 but the casing 37, bushing 35, and power input shaft 3 can continue to move down axially against the resistance of spring 21. During this movement of casing 37, it will move the locking sleeve 81 downwardly and after a short axial movement thereof the enlarged diameter 85 of the sleeve will reach the level of locking ball 79 which will be cammed out by curved seat 83 under relatively light pressure from spring 68 acting to push the sleeve 63 upwardly. When the ball 79 is out of seat 83, the sleeve 63 will return to its up position wherein its ratchet teeth 64b engage teeth 64a of plate 45 and the output shaft 95 will be operatively connected to input shaft 3 to rotate the tool which is already engaged with the work. Thus the mechanism which has been automatically locked at the maximum torque is automatically unlocked. It is to be noted that by using the ratchet teeth connection between members 45 and 63 reconnection is achieved by means of relatively light spring 68 which stores much less energy than spring 61, thus minimizing shock. Such shock as may occur upon reengagement or unlocking of the mechanism will be taken by spring 68 and will not be transmitted to the output shaft 95.

*Construction of modified form*

The modified form of torque clutch mechanism of this invention is shown in Figs. 7-12. It receives rotary driving torque from any suitable machine or power drive. A fragment of the head of a machine 201 is illustrated and it has the rotary square drive 202 that rotates the drive collar 203 and has a radial projection 204 disposed in a hole 205 in the collar to prevent the collar from slipping off the drive 202. The torque clutch has a spindle 206 which is part of ball plate 207 and which threads into collar 203 so that the rotation of the collar rotates the ball plate 207.

The rotary spindle 206 is mounted in a sealed ball bearing set 208, the inner race of which is fitted on portion 209 of the spindle part of ball plate 207 and the outer race of which is seated on top of sleeve 210 contained in casing 211. A cap 212 threads on to the top of casing 211 holding the outer race 208 on the top of sleeve 210.

A shoulder 213 on ball plate 207 supports the inner race of bearing 208. Clutch plate 207 drives the lower clutch plate 214 through a plurality of balls 215 preferably five in number, which are preferably equiangularly spaced around the axis of the plates 207 and 214 (the drawing showing two balls on a diameter in order to make the construction more readily understood). A spacer 216 is placed between the plates 207 and 214 to keep the balls 215 equally spaced at all times. The spacer or ball locater which may be used in the form of Figs. 1–6, is preferably at least one-half the diameter of the balls to provide positive insurance against the possibility of jamming due to uneven spring pressure on the various balls. The clutch plates 207 and 214 have registering identical drilled holes 217 and 218, respectively, of slightly smaller diameter than the balls 215, in which the balls 215 are seated to key the clutch plates 207 and 214 together. It is to be noted that the balls are seated on the sharp, squared edges 219A and 219B of the drilled holes so that there is merely a circular line contact between each ball 215 and the plates 207 and 214. This feature permits high torque transmittal, minimizes surface contact and friction, and makes it possible to rework the ball seats by simply grinding a few thousandths off the flat drilled faces 220 and 221, respectively, of the plates 207 and 214 to produce sharp, new edges 219A and 219B. The line contacts of the balls 215 with the edges 219A and 219B are preferably rather near the midplanes of the balls 215, the distance of them from the midplanes affecting, of course, the torque that they can transmit without rolling out of the holes.

The holes 222 in the spacer 216 are slightly larger than the balls 215 to permit the balls 215 to move freely. The clutch plates 207 and 214 and the spacer 216 are centered or axially aligned by the shaft 223 which is threaded into the plate 207. The shaft 223 also serves to align the spring 224 which bears upon the thrust bearing 225A which in turn bears upon plate 214 to force it up against the balls 215 and toward plate 207. When the torque transmitted from the plate 207 to the plate 214 through the balls 215 exceeds a value determined by the spring 224, the balls 215 will force the plate 214 down and roll out of their seats 219A and 219B and disconnect plate 214 from plate 207.

The adjustment of tension on spring 224 is made by threading adjusting sleeve 225 to the desired position on shaft 223; then Allen screw 226 threaded within sleeve 225 is tightened to abut against the end of shaft 223 to lock the sleeve 225 in position.

Prior to the disconnection and when the balls 215 operate to drivingly connect the plates 207 and 214, clockwise driving rotation from plate 214 is transmitted to ratchet sleeve 227 by means of interfitting ratchet teeth 264A and 264B on plate 214 and sleeve 227, respectively. The split circular flat spring 228 which is attached by a rivet or screw to casing 211 forces three balls 229 through holes in the casing 211 and sleeves 210 and 232 into recesses 230 in ratchet sleeve 227 to hold the teeth 264A and 264B of plate 214 and sleeve 227 in engagement. Spring 228 permits downward movement of sleeve 227 by letting lock balls 229 be forced outward and then forcing them into recesses 231, thus holding sleeve 227 in the downward or disengaged position when plate 214 moves downward as the balls 215 roll off of their seats. When the cam 227 engages the cam 214, the lock ball 229 is seated in the recess 230. When the came 227 disengages the cam 214, the lock ball 229 is in recess 231. The recess 231 is located closer to the teeth 264B than recess 230. A line through the centers of recesses 230 and 231 is parallel to slots 233 and located halfway between each pair of slots 233.

The rotary movement of ratchet sleeve 227 is transmitted to the cam sleeve 232 by a cam-key connection that, upon downward axial movement of sleeve 227, forces the sleeve 232 to move angularly (rotatably) relative to the rotatable parts 227, 214, 207, and 203, that have already been described. The angular movement of sleeve 232 is such that it is speeded up or moves ahead of parts 227, 214, etc. The cam-key connection comprises a series of slots 233 (preferably three) formed in sleeve 227 and the same number of slots 234 in sleeve 232. The slots 233 and 234 register with each other when the balls 215 are in their seats 219A and 219B. The slot 233 and 234 are preferably straight (even though cut on cylindrical surfaces) and are all cut at the same angle. For manufacturing reasons (avoid cutting the grooves on the I.D.), the slots 234 will normally cut through the wall of sleeve 232 but the slots 233 will be grooved out of the periphery of sleeve 227, the slots opening out of the top of sleeve 227 to permit the balls to be inserted in the grooves. The slots are inclined so that the top end is the leading edge with respect to the direction of rotation. The angle between each slot and a vertical line extending from the bottom of the slot is preferably around 30–60 degrees. A plurality of balls 235, preferably about five, are disposed in each pair of registering slots 233—234 and act as friction-free keys between sleeves 227 and 232. The balls 235 will roll to the bottom (trailing edge) of slots 233 in sleeve 227 and to the top (leading edge) of slots 234 in sleeve 232 when clutch is in engaged position. When the sleeve 227 is forced down during the instant of disconnection (by balls 215) the balls 235 will roll toward the top (leading edge) of slots 233 in sleeve 227 and toward the bottom (trailing edge) of slots 234 of sleeve 232. Hence, when the sleve 227 is forced down during the instant of disconnection (by balls 215), the walls of slots 233 in sleeve 227 will carry the balls 235 down with the sleeve. Since the balls 235 are moving down and they engage the walls of slots 234 in sleeve 232, they will try to force the sleeve 232 to move down also. The sleeve 232, however, is fixed in axial position and cannot move down. The balls 235 will therefore have to roll down the incline of slots 234 and since the balls are being pressed with an axial force against the incline they will wedge or cam the sleeve 232 forward in the direction of rotation (and relative to sleeve 227) until the balls 215 are out of the holes 219A and 219B (Fig. 5). The angle of the slots will determine the mechanical advantage of this camming action and in conjunction with the diameter of balls 215 will determine the amount of such rotation relative to sleeve 227. It is possible, therefore, in the design of the unit to control or predetermine these factors.

The torque is transferred from the driving unit 201 through the driver 202, clutch parts 203, 207, 215, 214, 227, 235 and 232. Driving plate 236 is connected to the bottom of sleeve 232, 210, and casing 211 by three lugs 237 which register with three slots 238 in parts 232, 210 and 211. The plate 236 is locked in position by end cap 239 thus retaining parts 232, 210 and 211 in the exact relative position with each other at all times. Plates 236 has a square hole 240 through which the square driver 241 projects and is movable axially. The square driver 241 is fastened by a cotter pin or the like to washer 242 at its upper end. The bushing 243 is held down on washer 242 by spring 244 one end of which is held stationary by shoulder 245 in sleeve 232. The spring 244 thus forces bushing 243 down on washer 242 which holds driver 241 so its projects its maximum length through plate 236. The drive 246 is part of driver 236 and is located outside of the clutch. Located in drive 246 is a projection 247 to hold sockets or other units being used with the clutch.

Operation of modified form

During operation of the mechanism to transmit power from power input shaft 202 to power output shaft 246, clockwise rotation of shaft 202 causes the collar 203 to rotate and this rotates spindle 206. The spindle rotates top clutch plate 207 and this rotation is transmitted to lower cluch plate 214 by virtue of balls 215 which are seated on the edges 219A and 219B of holes 217 and 218 in the clutch plates. The lower clutch plate 214 has ratchet teeth 264a which engage the teeth 264b on ratchet sleeve 227 so that clockwise rotation of the plate 214 causes similar rotation of sleeve 227. By virtue of the cam-key connection provided by the balls 235 acting in slots 233 and 234, rotation of sleeve 227 is transmitted to cam sleeve 232. The sleeve 232 transmits rotation to drive plate 236 through lugs 237 in slots 238. Drive plate 236 rotates square driver 241 and square drive 246 by square hole 240 in plate 236. Torque transmitted through various parts, as just described, can be removed by suitable connection to square drive 246.

As indicated hereinbefore, the length of the spring 224 can be varied by means of adjusting sleeve 225 and this adjustment determines the maximum torque that the balls 215 will transmit from clutch plate 207 to clutch plate 214. When the torque from input shaft 202 to output square drive 246 is in excess of the torque as determined by spring 224, the couple on each of the balls 215 will force them to start to roll to the left out of their seats on the edges of holes 217 and 218. The balls 215 act like cams and wedge the plate 214 (and sleeve 227) downwardly against the resistance of spring 224. Because of the line contact feature due to sharp corners 219a and 219b, friction is minimized and the balls roll rather than slide and for this reason the clutch itself does not throw an additional torque absorbing resistance into the system. When the balls 215 are completely out of the holes 217 and 218 (see Fig. 9) the maximum downward movement of members 214 and 227 has occurred. At this point the lock ball 229 is pushed into recess 231 by the pressure of spring 228. Continued rotation of top clutch plate 207 brings the next holes 217 and 218 into alignment with each ball 215 and the pressure of the spring 224 forces the balls to seat again and lifts plate 214 from sleeve 227 so that ratchet teeth 64A and 64B are disengaged (see Fig. 5). In this position the clutch plates 207 and 214 will rotate idly supported by bearing 208 but sleeve 227 is stationary and no torque or rotation reaches output square drive 246.

The torque at which the spring 224 is overcome and at which the balls 215 roll out of the holes over faces 220 and 221 of clutch plates 207 and 214 is not the maximum torque delivered to output square drive 246. As pointed out hereinabove, when the sleeve 227 is cammed down by balls 215, the balls 235 are carried downwardly with the sleeve. The balls 235, therefore, operate in slots 234 of sleeve 232 to cam it angularly about the axis of revolution and this applies a torque to output square drive 246 that is greater than the maximum torque as determined by the spring 224. The magnitude of the cam torque and the degree of angular movement can, as mentioned before, be regulated by the slope of the slots and diameter of balls 215. Since the cam torque is not acting in opposition to spring 224 which has already been overcome, it will be seen that the control spring 224 can be much smaller and weaker than it would be if the cam-key connection was not used. The last bit of angular movement of the work (e.g. bolt, nut, etc.) requires the most torque and it will be seen that this is accurately and positively provided by the cam balls 215 and cam balls 235 independently of the various springs. In other words, the maximum or cut out torque of the clutch mechanism is dependent upon the operation of balls 235 in slots 233 and 234. Viewing the torque disconnect as a whole, it will be noticed that the control spring 224 puts ball cam 215 system into operation and that this in turn operates the ball cam 235 system. The ball cam 215 system stops automatically when the balls are out of holes 217 and 218 and this, of course, deactivates ball cam 235 system and power output square drive 246.

After the unit has disconnected itself, the sleeve 227 will be locked in down position by balls 29 held in recess 231 by spring 228. In this condition, the sleeve 227 and output square drive 246 will be stationary so that the tool carried by square drive 246 can engage work without damage to either. When the tool on square drive 246 is aligned with a bolt to be tightened, or other workpiece, and the head 201 is moved down to effect operative engagement of tool and workpiece, the contact of the tool (which is not rotating) with the workpiece, will fix the axial position of square drive 246, square driver 241, washer 242, and bushing 243, but the assembly consisting of all other parts of the clutch can continue to move down axially against the resistance of spring 244. During this movement, sleeve 227 will be forced up axially by bushing 243, balls 229 will be moved outward from recess 231 against spring 228, the teeth 264B on sleeve 227 will engage the teeth 264A on plate 214, and the balls 229 will be forced into recess 230 by spring 228. The output square drive 246 will be operatively connected to the input shaft 202 to rotate the tool which is already engaged with the work. Thus, the mechanism which has been automatically locked at the maximum torque is automatically unlocked.

It is evident that it is within the purview of the invention to make any changes in the actual structural features that have been described by way of illustrating the principles of the invention.

I claim:

1. In a torque clutch, a rotary driving member, a rotary driven member, means operative to transmit torque from the driving member to the driven member only while the torque is below a predetermined maximum torque and above said predetermined maximum torque acting to move the driven member axially relative to the driving member to break the torque transmitting connection between the members, and means actuated by said axial movement and operative to angularly move the driven member in the direction of rotation relative to the driving member.

2. In a torque clutch, a power receiving input member, a power output member, clutch means operatively connecting the members and operated by a predetermined torque to disconnect the members, said clutch means being variable in length, and cam means operated by and during said variation in length to angularly move and apply torque to said output member as said clutch means disconnects.

3. In a torque clutch, a rotary driving member, a rotary driven member, balls seated on and between the members and keying them together to transmit torque, spring means pressing the members together to hold the balls in place between the members, one of said members being axially movable against the resistance of said spring means to a position wherein said balls come out of their seats and are inoperative to transmit torque, a radially movable lock member engageable with said one member to lock it in said position, an axially movable lock operator for controlling the position of said lock member, a casing for the members and means, said operator being movable into contact with the casing when it holds the lock member in locking position, said operator and casing being axially movable relative to the remaining said members and means and said operator being axially movable relative to said casing.

4. In a torque clutch, a driving clutch member, a driven clutch member, rolling means between the members for keying them together to transmit torque, one of the members being axially movable, first spring means acting against said one of the members to press them together, said spring means being overcome at a predetermined transmitted torque to permit axial movement of said one member away from the other and to release said rolling means and prevent substantial torque transmittal between the members, a clutch element free of said spring means and abutting said one member in a driven torque transmitting connection and movable with it away from the other member to a position wherein said rolling means is released, releasable lock means for holding the element in said position, said spring means acting to separate said one member from said element and break said connection when said element is locked in said position, and a second spring means of less resistance than the first acting upon said element to force it against said one member and reestablish said connection when said element is released from locked position.

5. The invention set forth in claim 4 including a rotatable seat supporting the end of said first spring means opposite to said one member to permit rotation thereof relative to the clutch element.

6. The invention set forth in claim 5 wherein said seat is adjustable along the axis of rotation to vary the effective length of the spring means.

7. In a torque clutch, a rotary driving member, a rotary driven member, sleeve means coaxial with the axis of revolution of said members, means connecting the driven member to the sleeve means to transmit torque thereto, a cap across the bottom of said sleeve means, a power output shaft threaded into said cap on said axis of rotation and capable of movement relative to said driven member in an axial direction, releasable torque transmitting means interconnecting the driving and driven members, a coil spring housed in said sleeve means and acting against the driven member to press it toward the driving member and hold the releasable means in operative position, a spring seat rotatably supported on and axially movable with said output shaft, said spring being seated on seat.

8. In a torque clutch, a torque receiving shaft, a rotary sleeve, means for transmitting torque from the shaft to the sleeve and disconnected at a predetermined torque and operative during disconnection to move said sleeve along its axis of rotation, a second sleeve coaxial with the first and fixed in axial position, said sleeves having registering inclined slots in the confronting walls thereof, ball means in said slots and keying the sleeves together and operative in said slots upon axial movement of the first sleeve to angularly move the second sleeve relative to the first, and a torque delivering shaft operatively connected to said second sleeve.

9. A torque clutch for attachment to a machine having a feed head with a rotary power output shaft therein, comprising, a housing secured to said head for feed motion therewith, a collar rotatably secured to said output shaft but axially movable relative thereto, spring means acting to force the collar away from the head, a spindle fixed to said collar and driven thereby, a first sleeve rotatably carried by the casing, a bearing rotatably supporting said spindle and carried by said first sleeve adjacent one end thereof, a first rotary clutch plate fixed to said spindle and having a flat radial face normal to the axis of rotation of said shaft, spindle, and plate, a second rotary clutch plate having a flat radial face normal to said axis of rotation and confronting said other radial face, said clutch plates having indentical cylindrical holes drilled therein opening out of said confronting radial faces, holes in one radial face being aligned with holes in the other and balls between the plates of slightly larger diameter than said holes seated on the corner edges thereof to connect said clutch plates together for the transmission of torque from the first plate to the second plate, said second plate having axially extending ratchet jaws on the side thereof opposite to said radial face, a second sleeve having axially extending jaws cooperating with the jaws on the second plate to receive torque therefrom, said second sleeve being axially movable away from the second rotary plate to disconnect said jaws, first spring means acting on the second sleeve to axially urge it into position in which the jaws are connected, a first sleeve and said second sleeve having registering inclined slots formed in the respective inner and outer walls thereof, the leading ends of said slots with respect to the direction of rotation of said second sleeve being axially closer to said jaws than the trailing ends, balls in said inclined slots keying the sleeves together for joint rotation but permitting axial movement of the second sleeve with respect to the first sleeve when said jaws are disconnected, said first sleeve having an opening through the wall thereof and said second sleeve having a recess that aligns with the opening when the second sleeve is in an axial position in which the jaws are disconnected, a ball in said opening and movable into said recess to lock the second sleeve in said axial position, a lock sleeve axially movable on said first sleeve and having a large diameter portion and a small diameter portion, both said portion being alignable with said opening, said ball being of larger diameter than the thickness of said first sleeve wall whereby it is pushed inwardly into said recess when the small diameter portion of the lock sleeve is aligned with the opening, the large diameter permitting the ball to move radially out of said recess when in alignment with said opening, second spring means urging the lock sleeve to move so that the small diameter portion is aligned with said opening, said lock sleeve being engageable by said housing when the small diameter portion thereof is aligned with the opening whereby feed movement of the head and housing will move the lock sleeve relative to the first sleeve to release said ball, said first sleeve having a bottom affixed thereto, a power output shaft secured to said bottom to receive torque from said first sleeve, means providing axial adjustment of said output shaft relative to said first sleeve, a spring seat carried by said shaft within the sleeve, said seat being axially adjustable with the shaft but rotatable relative to the shaft, and a spring seated on said seat and bearing on the second clutch plate to urge said radial faces together.

10. In a torque clutch, a driving clutch plate, a driven clutch plate, rolling means between confronting faces of the plate and acting to key them together, a driven member adjacent said driven plate, cooperating ratchet teeth on said member and driven plate connecting them together for angular movement in one direction, said driven plate having a center hole therethrough, a rod extending through said hole and anchored in said driving plate, and a coil spring associated with the rod pressing against said driven plate and a shoulder on the rod to resist separation of the plates, said spring being located in a hole in said driven member.

11. In a torque clutch, a rotatable and axially movable first sleeve, means operative at a predetermined torque to move said sleeve axially in one direction and disconnect it from a source of rotation, a rotatable second sleeve, cam-key means connecting the two sleeves so that axial movement of the first sleeve causes rotation of the second sleeve, means providing a radial shoulder facing opposite to said one direction and spaced axially therefrom in the direction of axial disconnecting movement of said first sleeve, a torque output member seated on said shoulder and connected to said second sleeve for rotation therewith, and means associated with said member for engaging said first sleeve to prevent relative axial movement of the first sleeve and member in said one direction, said second sleeve being movable axially in said one direction relative to said member.

12. In a torque applying device, a power input member, a power output member, a first rotary element connected to one of the members, a second rotary element connected to the other of said members, said elements being axially movable relative to each other along their axis of rotation, said elements having confronting surfaces with registering slots therein inclined to said axis of rotation of said elements, key means in said slots keying the elements together so that relative axial movement of the elements causes rotation of one of the elements in a direction to apply torque, and means responsive to torque transmitted by said device for moving said elements axially relative to each other.

(References on following page)

References Cited in the file of this patent

UNITED STATES PATENTS

| | | | |
|---|---|---|---|
| 748,018 | Rowe | Dec. 29, | 1903 |
| 1,118,132 | Jones | Nov. 24, | 1914 |
| 1,555,098 | Benko | Sept. 29, | 1925 |
| 1,725,562 | Borchert | Aug. 20, | 1929 |
| 1,813,372 | Wildhaber | July 7, | 1931 |
| 2,248,133 | Snow | July 8, | 1941 |
| 2,259,149 | Cederstrom | Oct. 14, | 1941 |
| 2,259,839 | Van Sittert | Oct. 21, | 1941 |
| 2,263,709 | Van Sittert | Nov. 25, | 1941 |
| 2,490,172 | Swahnberg | Dec. 6, | 1949 |
| 2,684,738 | Kaplan | July 27, | 1954 |
| 2,732,050 | Van Sittert | Jan. 24, | 1956 |